United States Patent
Lee et al.

(10) Patent No.: US 9,343,816 B2
(45) Date of Patent: May 17, 2016

(54) ARRAY ANTENNA AND RELATED TECHNIQUES

(71) Applicant: Raytheon Company, Waltham, MA (US)

(72) Inventors: Jar J. Lee, Irvine, CA (US); Stan W. Livingston, Fullerton, CA (US)

(73) Assignee: Raytheon Company, Waltham, MA (US)

( * ) Notice: Subject to any disclaimer, the term of this patent is extended or adjusted under 35 U.S.C. 154(b) by 307 days.

(21) Appl. No.: 13/859,072

(22) Filed: Apr. 9, 2013

(65) Prior Publication Data

US 2014/0302807 A1    Oct. 9, 2014

(51) Int. Cl.
| | |
|---|---|
| *H04B 1/06* | (2006.01) |
| *H01Q 21/00* | (2006.01) |
| *H04B 1/16* | (2006.01) |
| *H01Q 21/06* | (2006.01) |

(52) U.S. Cl.
CPC ......... *H01Q 21/0006* (2013.01); *H01Q 21/065* (2013.01); *H04B 1/16* (2013.01)

(58) Field of Classification Search
None
See application file for complete search history.

(56) References Cited

U.S. PATENT DOCUMENTS

| | | | |
|---|---|---|---|
| 3,846,721 A | 11/1974 | Fritz et al. | |
| 4,686,536 A | 8/1987 | Allcock | |
| 5,172,082 A | 12/1992 | Livingston et al. | |
| 5,453,751 A | 9/1995 | Tsukamoto et al. | |
| 5,880,694 A | 3/1999 | Wang et al. | |
| 6,147,648 A | 11/2000 | Granholm et al. | |
| 6,424,298 B1 * | 7/2002 | Nishikawa et al. | .... 343/700 MS |
| 6,459,415 B1 | 10/2002 | Pachal et al. | |
| 6,512,487 B1 | 1/2003 | Taylor et al. | |
| 6,856,297 B1 | 2/2005 | Durham et al. | |
| 6,867,742 B1 | 3/2005 | Irion, II et al. | |
| 6,876,336 B2 | 4/2005 | Croswell et al. | |
| 6,977,623 B2 | 12/2005 | Durham et al. | |
| 7,012,572 B1 | 3/2006 | Schaffner et al. | |
| 7,084,827 B1 | 8/2006 | Strange et al. | |
| 7,109,821 B2 | 9/2006 | Engargiola | |
| 7,113,142 B2 | 9/2006 | McCarville et al. | |
| 7,138,952 B2 | 11/2006 | Mcgrath et al. | |
| 7,221,322 B1 | 5/2007 | Durham et al. | |
| 7,315,288 B2 | 1/2008 | Livingston et al. | |

(Continued)

FOREIGN PATENT DOCUMENTS

| | | |
|---|---|---|
| JP | H07-106841 | 4/1995 |
| WO | WO 2009/077791 A1 | 6/2009 |

OTHER PUBLICATIONS

Kindt, et al.; "Polarization Correction in Dual-Polarized Phased Arrays of Flared Notches;" Antennas and Propagation (APSURSI); IEEE International Symposium; Jul. 3-8, 2011; pp. 1961-1964.

(Continued)

*Primary Examiner* — Lana N Le
(74) *Attorney, Agent, or Firm* — Daly, Crowley, Mofford & Durkee, LLP

(57) ABSTRACT

An antenna array includes a plurality of radiating elements disposed on a layer that is situated above an egg crate structure that is formed of interconnected dielectric panels. In some embodiments, balun circuitry is disposed on at least some of the dielectric panels of the egg crate structure for use in feeding corresponding radiating elements of the array in a balanced manner. Ground plane blocks may also be coupled to some or all of the dielectric panels to provide circuit shielding and/or to form a ground plane for the array antenna.

23 Claims, 11 Drawing Sheets

(56) References Cited

U.S. PATENT DOCUMENTS

| | | | |
|---|---|---|---|
| 7,358,921 B2 | 4/2008 | Snyder et al. | |
| 7,414,590 B2 | 8/2008 | Bij De Vaate et al. | |
| 7,675,466 B2 * | 3/2010 | Gaucher et al. | 343/700 MS |
| 8,106,846 B2 | 1/2012 | Kikin | |
| 8,154,466 B2 | 4/2012 | Lewis et al. | |
| 8,350,774 B2 | 1/2013 | Pickles | |
| 8,952,752 B1 * | 2/2015 | Huettner | 330/84 |
| 2003/0112200 A1 | 6/2003 | Marino | |
| 2005/0156802 A1 | 7/2005 | Livingston et al. | |
| 2006/0097947 A1 | 5/2006 | McCarville et al. | |
| 2012/0146869 A1 | 6/2012 | Holland et al. | |
| 2013/0250536 A1 | 9/2013 | Satake | |
| 2015/0116174 A1 | 4/2015 | Yona et al. | |
| 2015/0123864 A1 * | 5/2015 | Boryssenko | 343/813 |

OTHER PUBLICATIONS

Cavallo, et al.; "Analysis of Common-Mode Resonances in Arrays of Connected Dipoles and Possible Solutions;" Radar Conference; IEEE; Sep. 30, 2009; pp. 441-444.

Hees, et al.; "Ultra Broadband Dual Polarized Dipole Array with Metallic Reflector;" International Conference on Ultra Wideband; IEEE; Sep. 9-11, 2009; pp. 744-747.

PCT International Search Report of the ISA for PCT/US2014/012929 dated Apr. 29, 2014.

PCT Written Opinion of the ISA for PCT/US2014/012929 dated Apr. 29, 2014.

Isom, et al.; "Dual Polarized Array Antenna with Modular Multi-Balun Board and Associated Methods;" U.S. Appl. No. 14/155,440, filed Jan. 15, 2014.

Nesic, et al.; "Wideband Printed Antenna with Circular Polarization;" Antennas and Propagation Society International Symposium; Jul. 13, 1997; pp. 1882-1885.

PCT Search Report of the ISA for PCT/US2015/011577 dated May 8, 2015.

Written Opinion of the ISA for PCT/US2015/011577 dated May 8, 2015.

Isom, et al.; "Dual Polarized Array Antenna with Modular Multi-Balun Board and Associated Methods;" Patent Application Filed Jan. 15, 2014.

Kasemodel, et al.; "Broadband Planar Wide-Scan Array Employing Tightly Coupled Elements and Integrated Balun;" Phased Array Systems and Technology (ARRAY) 2010 IEEE International Symposium on; Oct. 12-15, 2010; pp. 467-472.

Kasemodel, et al.; "Broadband Array Antenna Enhancement with Spatially Engineered Dielectrics;" U.S. Appl. No. 13/590,769, filed Aug. 21, 2012.

PCT International Preliminary Report of the ISA for Appl. No. PCT/US2014/012929 dated Oct. 22, 2015; 8 pages.

Office Action dated Jan. 15, 2016; for U.S. Appl. No. 14/155,440; 29 pages.

Response dated Mar. 21, 2016 to Office Action dated Jan. 15, 2016; For U.S. Appl. No. 14/155,440; 18 pages.

* cited by examiner

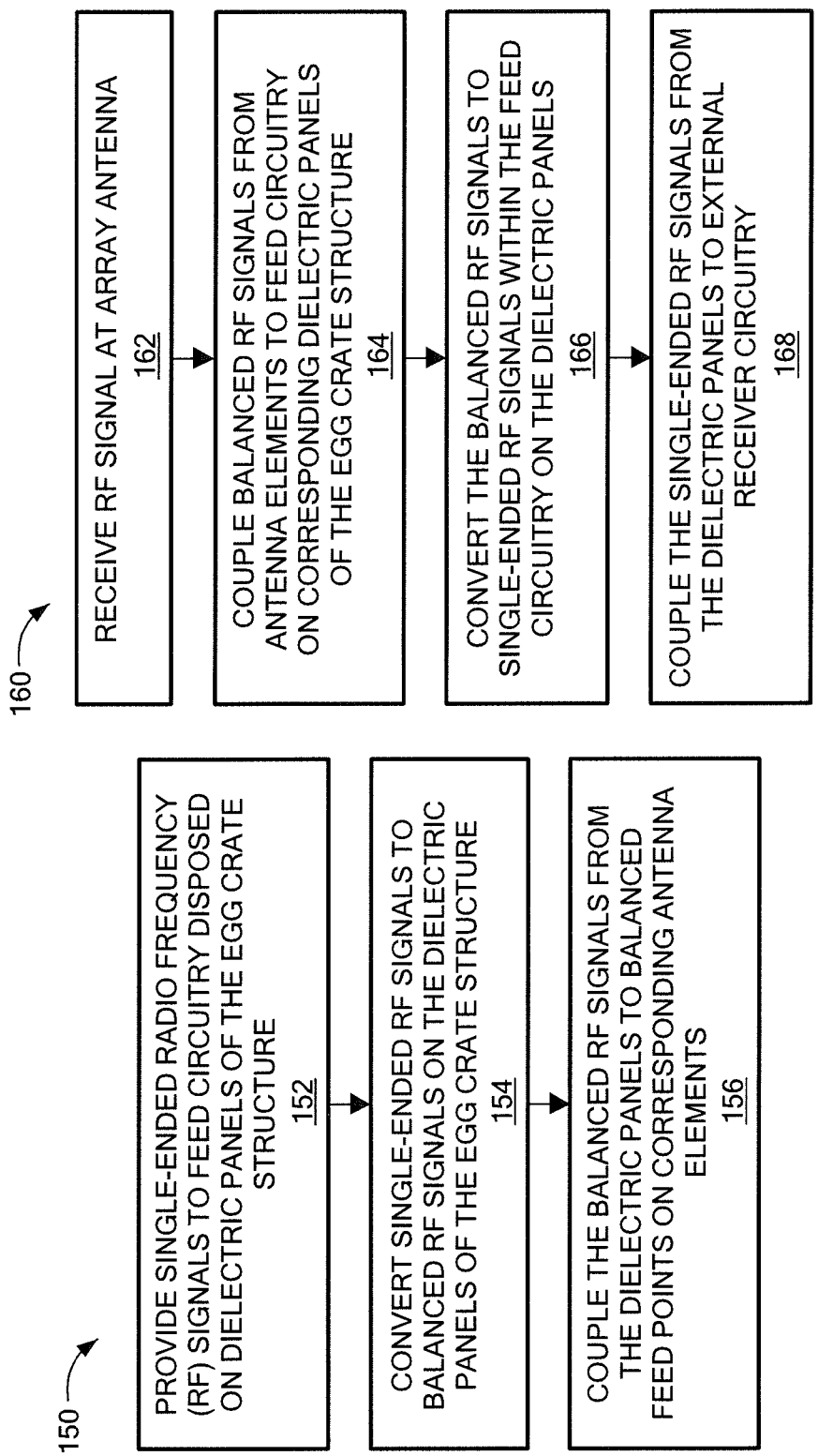

ND RELATED TECHNIQUES

ARRAY ANTENNA AND RELATED TECHNIQUES

FIELD

Subject matter disclosed herein relates generally to RF systems and, more particularly, to antenna systems having an array of antenna elements.

BACKGROUND

Many modern antenna applications require high bandwidth, dual polarization array antennas. In addition, many of these applications also require low cross polarization between antenna elements. A further desirable quantity is for the elements of an array antenna to have coincident phase centers for different polarizations to reduce the need for complicated polarization calibrations. It is also generally desirable that antenna designs be relatively easy and low cost to manufacture. Due to size and weight constraints in some applications, it may also be desirable that antennas be lightweight and relatively low-profile. Thus, there is a general need for antenna designs that are capable of providing some or all of these various attributes.

SUMMARY

In accordance with one aspect of the concepts, systems, circuits, and techniques described herein, an array antenna comprises: a plurality of radiating elements on a first layer thereof, the plurality of radiating elements including elements that are driven in a balanced fashion; an egg crate structure below the first layer, the egg crate structure comprising a plurality of first dielectric panels arranged in a first orientation and a plurality of second dielectric panels arranged in a second orientation and interconnected with the plurality of first panels; and at least one balun disposed on at least one of the dielectric panels of the egg create structure for use in feeding at least one of the radiating elements in the plurality of radiating elements.

In one embodiment, the at least one balun includes multiple baluns disposed on multiple dielectric panels of the egg create structure for use in feeding multiple radiating elements in the plurality of radiating elements. In one embodiment, some of the multiple baluns feed corresponding antenna elements in a first polarization direction and some of the multiple baluns feed corresponding antenna elements in a second polarization direction that is orthogonal to the first polarization direction.

In one embodiment, the plurality of first dielectric panels and the plurality of second dielectric panels define a plurality of open regions within the egg crate structure, wherein at least some of the plurality of first dielectric panels and at least some of the plurality of second dielectric panels have ground plane blocks attached thereto that at least partially fill corresponding open regions in the egg crate structure.

In one embodiment, the ground plane blocks act collectively to form a ground plane for the array antenna.

In one embodiment, at least some of the ground plane blocks partially or fully cover balun circuitry on corresponding dielectric panels, the ground plane blocks having spacer projections to space the blocks from the balun circuitry to prevent shorting.

In one embodiment, the ground plane blocks are conductively coupled to planar ground structures disposed on surfaces of corresponding dielectric panels.

In one embodiment, at least some of the ground plane blocks include two sloped surfaces that allow the ground plane blocks to fit closely together within the open regions of the egg crate structure, wherein at least one sloped surface of a first ground plane block in a first open region is proximate to and substantially parallel with a sloped surface of another ground plane block in the first open region.

In one embodiment, the plurality of first dielectric panels are substantially orthogonal to the plurality of second dielectric panels and the plurality of open regions within the egg crate structure include a plurality of substantially rectangular regions; and each of the two sloped surfaces of the first ground plane block form an approximately 45 degree angle with a surface of a dielectric panel carrying the first ground plane block.

In one embodiment, the egg crate structure includes at least one substantially rectangular region that includes four ground plane blocks; and the array antenna further comprises an elongated member of energy absorbing material located within a space between the four ground plane blocks in the at least one substantially rectangular region to prevent electromagnetic resonance effects in the space.

In one embodiment, the first dielectric panels and the second dielectric panels have projections from edges thereof that fit through openings on a face sheet, the projections being secured to the face sheet on an opposite side of the face sheet from the panels, at least some of the projections having conductive transmission structures disposed thereon that are conductively coupled to transmission structures on the opposite side of the face sheet, wherein the conductive transmission structures on the projections and the transmission structures disposed on the opposite side of the face sheet include feed structures for use in feeding the plurality of radiating elements.

In one embodiment, the plurality of radiating elements on the first layer include an array of tiles that define radiating slots; the first layer is located above the face sheet; and the transmission structures disposed on the opposite side of the face sheet are non-conductively coupled to the array of tiles.

In one embodiment, the conductive transmission structures on two projections of a first dielectric panel include balanced lines that are coupled to a balun disposed on the first dielectric panel.

In one embodiment, the at least one balun is formed using co-planar waveguide.

In one embodiment, the array antenna further comprises at least one isolation resistor coupled between the balanced output lines of a balun disposed on a dielectric panel of the egg crate structure.

In one embodiment, the at least one balun includes a first balanced output line that includes tapered transmission line sections on the top and bottom surfaces of the at least one dielectric panel of the egg crate structure that are rotated mirror images of one another, and a second balanced output line that includes a tapered transmission line section, wherein the second balanced output line is different from the first balanced output line.

In accordance with another aspect of the concepts, systems, circuits, and techniques described herein, a method of operating an array antenna having a plurality of antenna elements situated over an egg crate structure formed from a plurality of dielectric panels, comprises: during a transmit operation: providing a first single-ended radio frequency (RF) signal to feed circuitry disposed upon a first dielectric panel of the egg crate structure; converting the first single-ended RF signal to a balanced RF signal on the first dielectric panel of the egg crate structure; and coupling the balanced RF signal from the first dielectric panel of the egg crate structure to balanced feed points of a corresponding antenna element of the plurality of antenna elements. Similar actions may be taken with respect to other antenna elements of the array antenna.

In one embodiment, the method further comprises: providing other single-ended RF signals to feed circuitry disposed on a number of other dielectric panels of the egg crate structure at the same time that the first single-ended RF signal is provided to the feed circuitry on the first dielectric panel; converting the other single-ended RF signals to other balanced RF signals on the corresponding dielectric panels of the egg crate structure; and coupling the other balanced RF signals from the corresponding dielectric panels of the egg crate structure to balanced feed points on corresponding antenna elements of the plurality of antenna elements.

In one embodiment, coupling the other balanced RF signals from the corresponding dielectric panels of the egg crate structure to balanced feed points on corresponding antenna elements of the plurality of antenna elements includes coupling some balanced RF signals to balanced feed points on corresponding antenna elements to produce vertical polarization transmission and coupling some balanced RF signals to balanced feed points on corresponding antenna elements to produce horizontal polarization transmission.

In one embodiment, the method further comprises: during a receive operation: receiving an RF signal at the array antenna from a remote wireless transmitter, coupling balanced RF signal components from antenna elements of the plurality of antenna elements to feed circuitry on corresponding dielectric panels of the egg crate structure; converting the balanced RF signal components to single-ended RF signals within the feed circuitry on the corresponding dielectric panels; and coupling the single-ended RF signals from the corresponding dielectric panels to external receiver circuitry.

In one embodiment, coupling balanced RF signal components from antenna elements of the plurality of antenna elements to feed circuitry on corresponding dielectric panels of the egg crate structure includes coupling some balanced RF signal components that were received in a vertical polarization and coupling some balanced RF signal components that were received in a horizontal polarization.

In one embodiment, the feed circuitry disposed on the first dielectric panel of the egg crate structure includes balun circuitry.

In one embodiment, the balun circuitry includes: a first balanced output line that includes tapered transmission line sections on the top and bottom surfaces of the first dielectric panel that are rotated mirror images of one another; and a second balanced output line that includes a tapered transmission line section.

BRIEF DESCRIPTION OF THE DRAWINGS

The foregoing features may be more fully understood from the following description of the drawings in which:

FIG. 10 is a flow chart illustrating a method for operating an array antenna having a plurality of antenna elements situated over an egg crate structure formed from a plurality of dielectric panels during a transmit operation in accordance with an embodiment; and FIG. 11 is a flow chart illustrating a method for operating an array antenna having a plurality of antenna elements situated over an egg crate structure formed from a plurality of dielectric panels during a receive operation in accordance with an embodiment.

DETAILED DESCRIPTION

Figure 1:
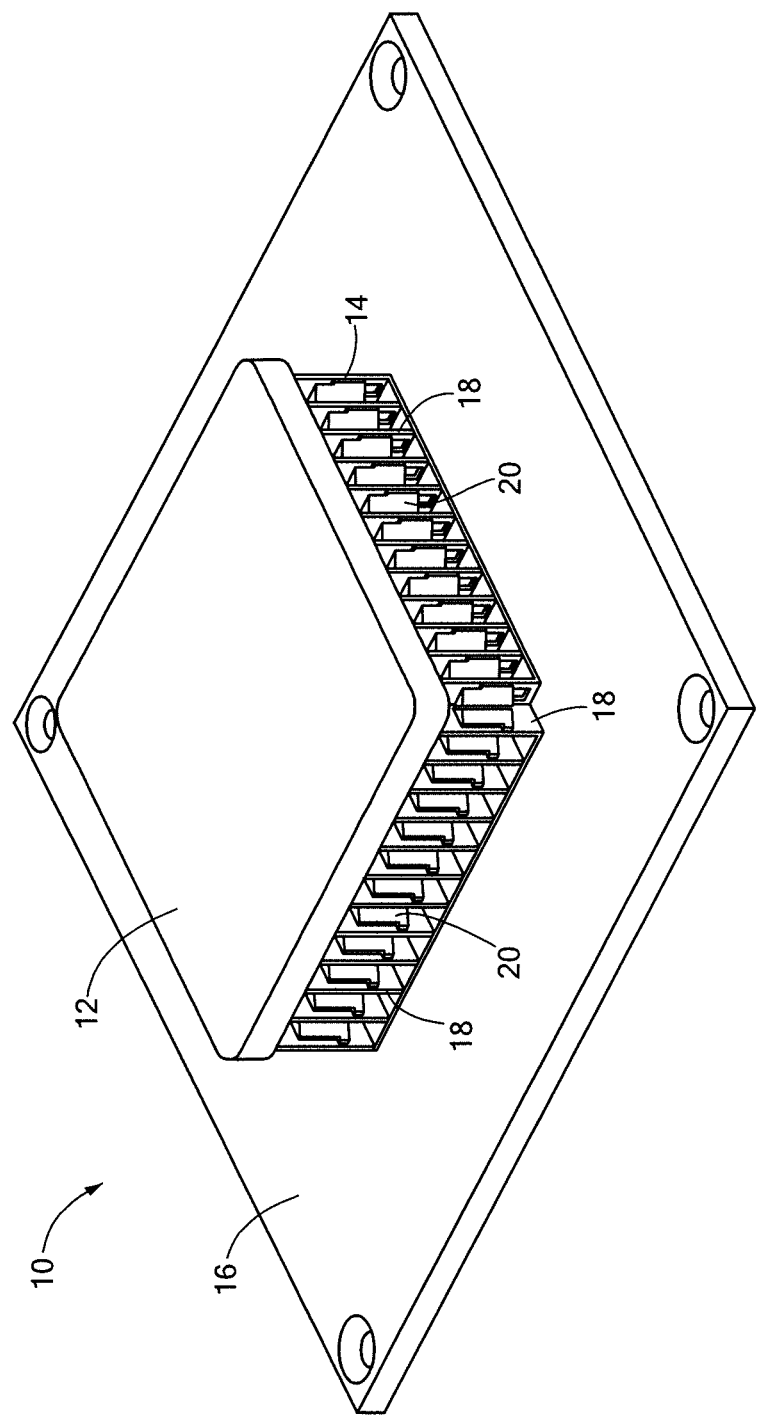
FIG. 1 is a diagram illustrating an exemplary dual polarized, co-phase centered array antenna in accordance with an embodiment.

FIG. 1 is a diagram illustrating an exemplary dual polarized, co-phase centered array antenna 10 in accordance with an embodiment. The array antenna 10 is capable of operation in multiple different polarizations with relative high bandwidth. The array antenna 10 is relatively easy and inexpensive to fabricate using printed circuit technology and can be made very low profile. The array 10 is capable of providing coincident phase centers at the element level and is also capable of operation with very low cross polarization, thereby reducing the need for complicated polarization calibration and increasing instantaneous phased array calibrated bandwidths. The array antenna 10 is well suited for multi-function radar and communications applications, as well as many other applications.

As illustrated in FIG. 1, array antenna 10 may comprise a planar aperture 12 that is formed over an egg crate structure 14. The egg carte structure 14 may be removably or permanently attached to a support structure 16. The support structure 16 may include, for example, a mounting plate, an outer surface of a vehicle or aircraft, or any other structure capable of supporting the antenna during operation. The planar aperture 12 may include, among other things, an array of radiating elements (not shown in FIG. 1) and a radome covering the radiating elements. The egg crate structure 14 may include a plurality of dielectric ribs or panels 18 that are interconnected with one another to provide a base for the planar aperture 12. As will be described in greater detail, the egg crate structure 14 may, in some implementations, include circuitry for feeding the radiating elements as well as structures for providing shielding and a ground plane for the antenna array. The dielectric panels 18 may, for example, have balun circuitry disposed thereon for use in providing a balanced feed for the radiating elements. In addition, in some embodiments, ground plane blocks 20 may be attached to the dielectric panels 18 of the egg crate structure 14 to form a ground plane for the antenna. The blocks 20 may also provide shielding for circuits within the array assembly.

In the embodiment illustrated in FIG. 1, array antenna 10 is configured for use in a frequency band having a 4:1 bandwidth. The antenna design can be modified for use in a wide variety of different frequency ranges. The array antenna 10 has a low profile of 1.287 inches for the assembly including the planar aperture 12 and the egg crate structure 14 (1.537 inches with the support plate). The spacing between the unit cells of the array is 0.330 inches in each dimension. In the illustrated embodiment, the array antenna 10 is a square array with a dimension of 4.26 inches per side and includes 12 unit cells in each dimension. Other shapes, sizes, and number of units cells may be used in other implementations.

Figure 2:
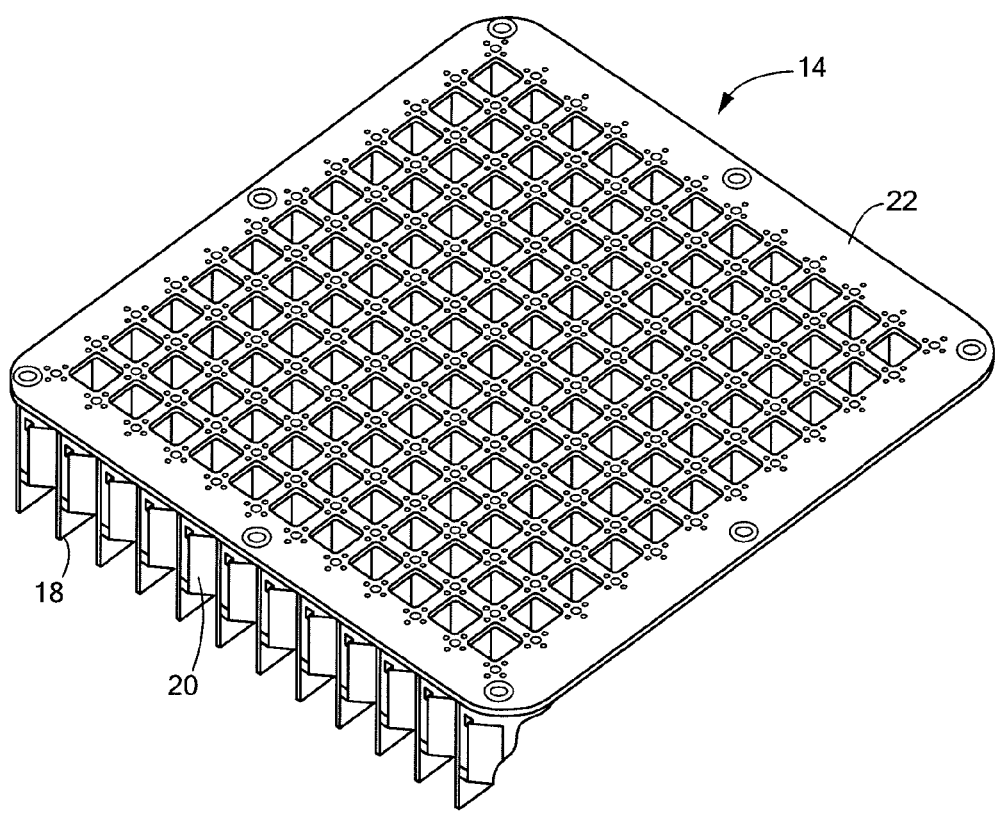
FIG. 2 is a perspective view of an exemplary egg crate structure that may be used in the array antenna 10 of FIG. 1 in accordance with an embodiment.

FIG. 2 is a perspective view of an exemplary egg crate structure 14 that may be used in the array antenna 10 of FIG. 1 with the planar aperture 12 removed. The dielectric panels 18 of the egg crate structure 14 may be interconnected in a manner that forms a grid. That is, some of the dielectric panels 18 may have a first orientation (e.g., vertical) and some of the dielectric panels 18 may have a second, orthogonal orientation (e.g., horizontal). Other configurations for interconnecting the panels may alternatively be used. A face sheet 22 may be installed over the interconnected panels 18. The face sheet may be made from, for example, a dielectric board material (e.g., Rogers 4003 manufactured by Rogers Corporation, etc.), but other material types may alternatively be used. Among other things, the face sheet 22 may serve to hold the panels 18 together in their desired configuration. As will be described in greater detail, the face sheet 22 may also have transmission structures disposed thereon for use in feeding antenna elements within the planar aperture 12. Alternatively, these transmission structures may be placed on another dielectric layer that is placed over the face sheet.

Figure 3:
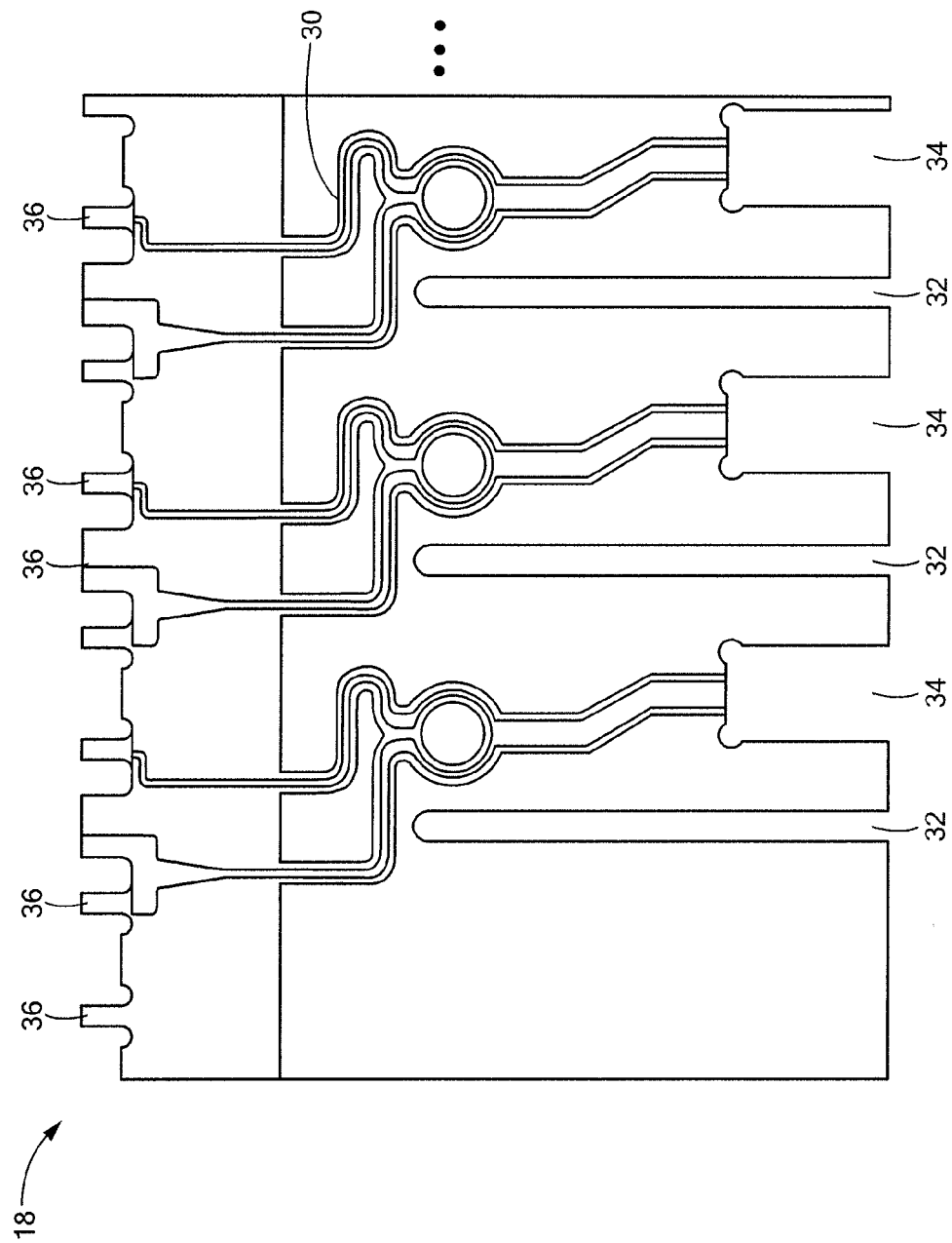
FIG. 3 is a side view of a portion of an exemplary dielectric panel that may be used in an egg crate structure in accordance with an embodiment.

FIG. 3 is a side view of a portion of an exemplary dielectric panel 18 in accordance with an embodiment. As shown, the dielectric panel 18 includes balun circuitry 30 disposed on a surface thereof. The dielectric panel 18 also has ground plane blocks 20 attached thereto for use in providing a ground plane for the antenna. Slots 32 may be formed in the dielectric panels 18 to facilitate interconnection of the panels. Panels to be used in a first orientation may have slots 18 along a bottom edge of the panel, while panels to be used in a second orientation may have slots 18 along a top edge of the panel. The panels may then be interconnected by coupling together the various slots. In some embodiments, voids 34 may also be provided in the panels 18 for installation of connectors for use in connecting the array antenna to external circuitry (e.g., an external beamformer, external transmit and/or receive circuitry, etc.). In some implementations, no connectors or voids 34 may be used. Any type of dielectric board material may be used for the dielectric panels 18. In one implementation, a 0.02 inch thick dielectric board manufactured by Rogers Corporation (Rogers 4003) is used for the panels 18.

As shown in FIG. 3, the dielectric panels 18 may also include projections 36 along an upper edge thereof for use in coupling the panels to a face sheet (e.g., face sheet 22 of FIG. 2). During antenna assembly, the projections 36 may be inserted into openings in the face sheet and secured in place. In one possible approach, the different panels 18 of the antenna may first be assembled together and then the face sheet may be placed over the panels 18 so that the openings in the face sheet fit over the corresponding projections 36. Solder or an adhesive (e.g., conductive epoxy, etc.) may then be used to secure the projections 36 to the face sheet using, for example, a low cost planar process. The solder or adhesive may be applied to an upper surface of the face sheet in some implementations (i.e., the side opposite the side where the panels are located). In another technique, the dielectric panels 18 may be inserted into the face sheet one at a time, with the panels 18 having slots 32 on the bottom edge being inserted first and then the panels having slots on the top edge. The panels 18 may be secured to the face sheet as they are inserted or in a single step after all panels have been inserted. This technique of applying solder or conductive adhesive to the face sheet dispenses with the need to solder or epoxy the unit cell panels/ribs together at the seams to provide structural integrity. Other assembly procedures may alternatively be used. In some embodiments, the projections 36 may be metalized to facilitate attachment and/or electrical connection.

Figure 4:
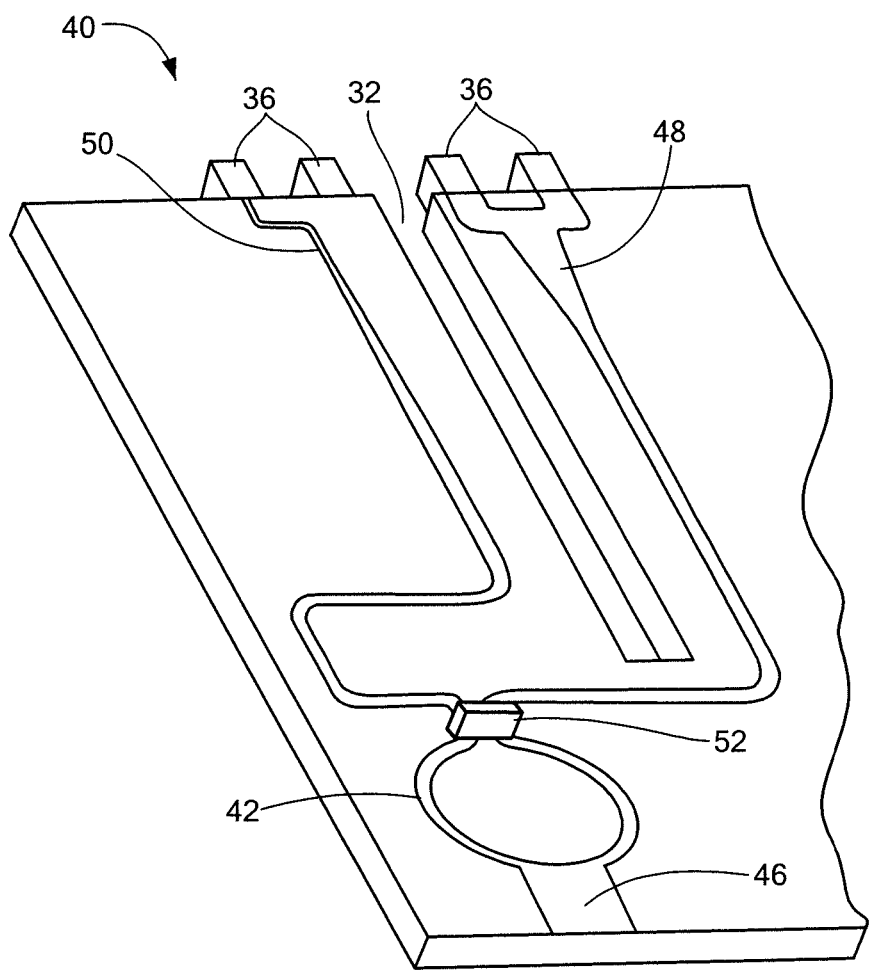
FIG. 4 is a diagram illustrating a portion of another exemplary dielectric panel in accordance with an embodiment.

FIG. 4 is a diagram illustrating a portion of another exemplary dielectric panel 40 in accordance with an embodiment. As shown, the dielectric panel 40 of FIG. 4 may include slots 32 along an upper edge thereof. As described above, these slots 32 may engage with slots along the lower edge of other panels (see FIG. 3) during antenna assembly. Dielectric panel 40 includes balun circuitry 42 disposed thereon for use in coupling balanced signals to and/or from a corresponding antenna element of a planar array. As is well known, a balun is a type of transformer that transforms between balanced and unbalanced (or single-ended) signals. Balun circuitry 42 includes a balanced port 44 to be coupled to the antenna element and a single-ended port 46 to be coupled to external circuitry (e.g., an external beamformer, external transmit and/or receive circuitry, etc.). The balun circuitry 42 may operate in both directions in some embodiments. That is, the balun circuitry 42 may convert single-ended signals to balanced signals during transmit operations and balanced signals to single-ended signals during receive operations. In some embodiments, the balun circuitry 42 may only operate in a single direction (e.g., when the array antenna is being used as transmit only antenna or a receive only antenna, etc.).

Dielectric panel 40 of FIG. 4 may include any type of balun circuitry that is capable of implementation within the available space of a dielectric panel. In at least one embodiment, a balun design is used that includes circuitry disposed on both sides of the dielectric panel 40. As shown in FIG. 4, balun circuit 42 on dielectric panel 40 includes, for one of its balanced feed lines, a tapered transmission line segment 48 on an upper surface of panel 40 and another tapered transmission line segment on a lower surface of panel 40 (not shown in FIG. 4) that is a rotated mirror image of tapered segment 48. FIG. 7, described below, illustrates the rotated mirror image transmission line segments in greater detail. This geometry taper is used to flip the polarity of the signal on the balanced line. For the other balanced feed line 50, balun circuit 42 also uses transmission line impedance tapering to provide an impedance match in the antenna (e.g., an impedance taper from 200 to 377 ohms in the illustrated embodiment). This transmission line impedance taper consists of a narrowing of the center conductor of the transmission line structure 50 as it approaches the corresponding projection 36. A similar taper may also be provided on the transmission line segment on the lower surface of dielectric panel 40 (e.g., a taper from 200 to 377 ohms at the end of the rotated mirror image of segment 48). The purpose of these transmission line tapers may be to more accurately match the free space wave impedance seen by the antenna. The balun circuit 42 may also include a ground plane region over a portion of the bottom surface of dielectric panel 40. This balun circuit design is capable of operation over a multiple octave bandwidth.

The balun circuit 42 of FIG. 4 also includes an isolation resistor 52 across the output lines thereof. It has been found that this isolation resistor improves the voltage standing wave ratio (VSWR) load pull over scan and power handling. In at least one embodiment, a thick film chip resistor (e.g., a 200 ohm 0402 resistor) having a diamond substrate is used as isolation resistor 52, although other types of resistors may alternatively be used.

As shown in FIG. 4, dielectric panel 40 may include projections 36 on an upper edge thereof for insertion into openings of a face sheet, as described previously. Some of the projections 36 may have transmission line structures disposed thereon that may be conductively coupled to transmission line structures on the face sheet (or on another dielectric layer placed over the face sheet) when the projections 36 are secured in place. As described previously, in one approach, the dielectric panels may be secured in place using solder or conductive epoxy. Both of these technique may provided conductive coupling between the transmission line segments on the projections 36, if any, and the transmission line segments on the face sheet. With reference to FIG. 4, the transmission line segments on at least some of the projections 36 may include the balanced signal lines associated with the balun circuitry 42. Balanced signal line 50 may be coupled to a projection 36 on an upper surface of panel 40. The other balanced signal line may be coupled to a projection 36 on the underside of the panel 40. A ground connection may also be made between the upper surface and the lower surface of panel 40 across one of the projections 36 (or in some other location).

Figure 5:
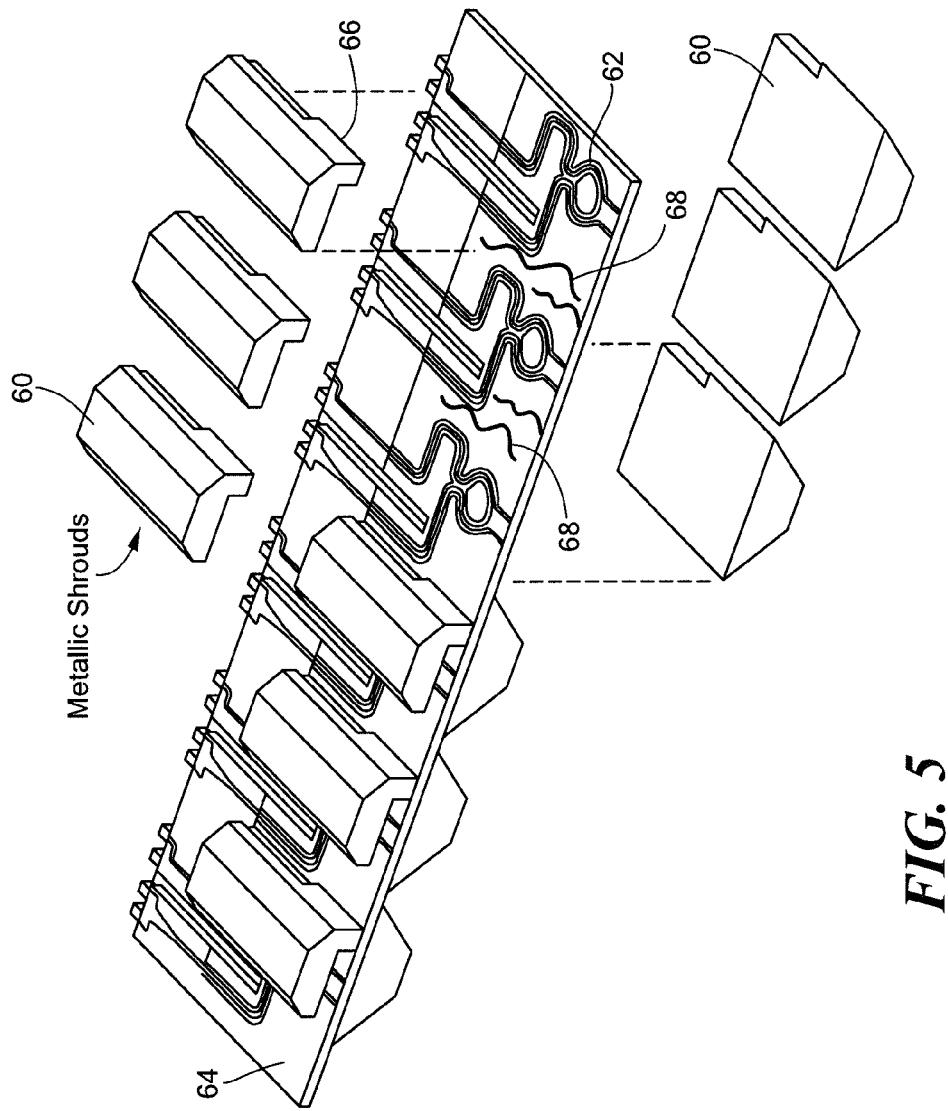
FIG. 5 is a diagram illustrating a technique for attaching ground plane blocks to dielectric panels in accordance with an embodiment.

As described previously, in some embodiments, ground plane blocks are attached to the dielectric panels of the egg crate structure to provide a ground plane for the antenna and to provide circuit shielding. FIG. 5 is a diagram illustrating one technique for attaching the ground plane blocks to the panels. As illustrated, the ground plane blocks 60 may be connected into positions above some or all of the balun circuitry 62 on a dielectric panel 64. The ground plane blocks 60 may include spacer structures 66 for preventing the blocks 60 from contacting (and potentially shorting) the balun circuitry 62 (or other circuitry) on the panel 64. In one attachment technique, conductive epoxy 68 may first be placed on the panel 64 in a location having ground metallization. The spacer structures 66 of the ground plane blocks 60 may then be pressed onto the conductive epoxy 68 and allowed to cure. Other attachment techniques may alternatively be used.

Figure 6:
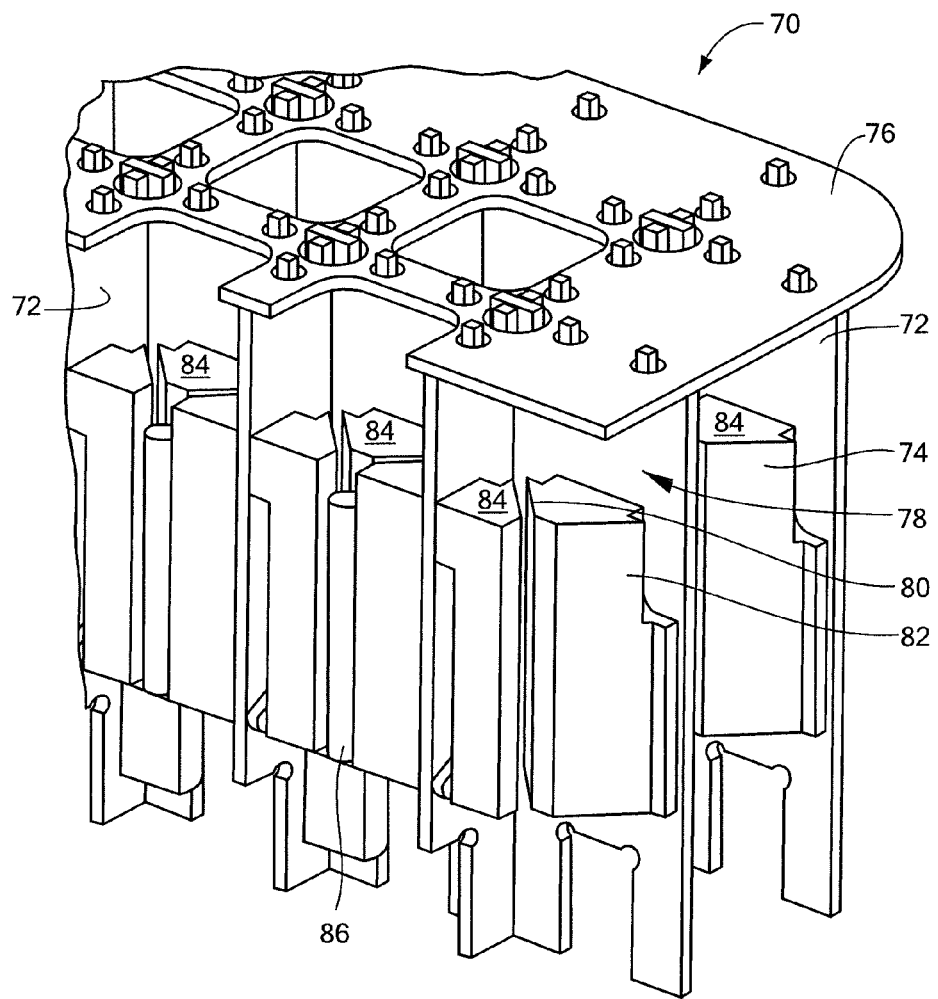
FIG. 6 is a sectional view of an assembly having dielectric panels with ground plane blocks connected together into an egg crate structure with a face sheet attached thereto in accordance with an embodiment.

FIG. 6 is a sectional view of an exemplary assembly 70 having dielectric panels 72 with ground plane blocks 74 connected together into an egg crate structure with a face sheet 76 attached thereto in accordance with an embodiment. As shown, when the panels 72 are interconnected, they define a plurality of open regions 78 that are generally rectangular (e.g., square) in shape (although other shapes may exist in other embodiments). The ground plane blocks 74 fill a portion of these open regions 78. As illustrated, in some embodiments, the ground plane blocks 74 may each have two sloped surfaces 80, 82 that allow the ground plane blocks 74 to fit closely together within the open regions 78 of the egg crate structure. These sloped surfaces may, for example, be close to and parallel with sloped surfaces 80, 82 of other ground plane blocks within an open region 78 so that a large level of fill may be achieved. In an embodiment that has rectangular open regions 78, the sloped surfaces 80, 82 of the ground plane blocks 74 may form 45 degree angles with the surfaces of the panels 72 the blocks 74 are mounted on. Other angle schemes may alternatively be used.

As shown in FIG. 6, when used, the ground plane blocks 74 may collectively form a ground surface 84 that forms a ground plane for the array antenna. This ground plane may dispense with the need to provide a separate ground back plane layer for the antenna. The ground plane blocks 74 may also provide shielding for the circuitry on the dielectric panels 72 to prevent, for example, cross-talk between the panels and/or undesired coupling between the panels and the antenna elements. As illustrated in FIG. 6, in some implementations, an elongated member of electromagnetic energy absorbing material 86 (e.g., Eccosorb®, etc.) may be inserted into a space between the ground plane blocks 74 to prevent electromagnetic resonance effects that might occur in the region (e.g., a cavity resonance effect that could draw energy away from the radiating elements).

In some embodiments, instead of four ground plane blocks 74 in an open region 78, a single large ground plane block attached to one of the corresponding panels may be used to fill most of the desired area. In another approach, two ground plane blocks may be attached to opposing panels that each fill one half of the desired area (or some other ratio, such as 60/40) within the open region 78. In some embodiments, the ground plane blocks are metallic (e.g., aluminum, copper, etc.), although other materials and material combinations may be used in other embodiments (e.g., plated dielectric materials, etc.).

Figure 7A:
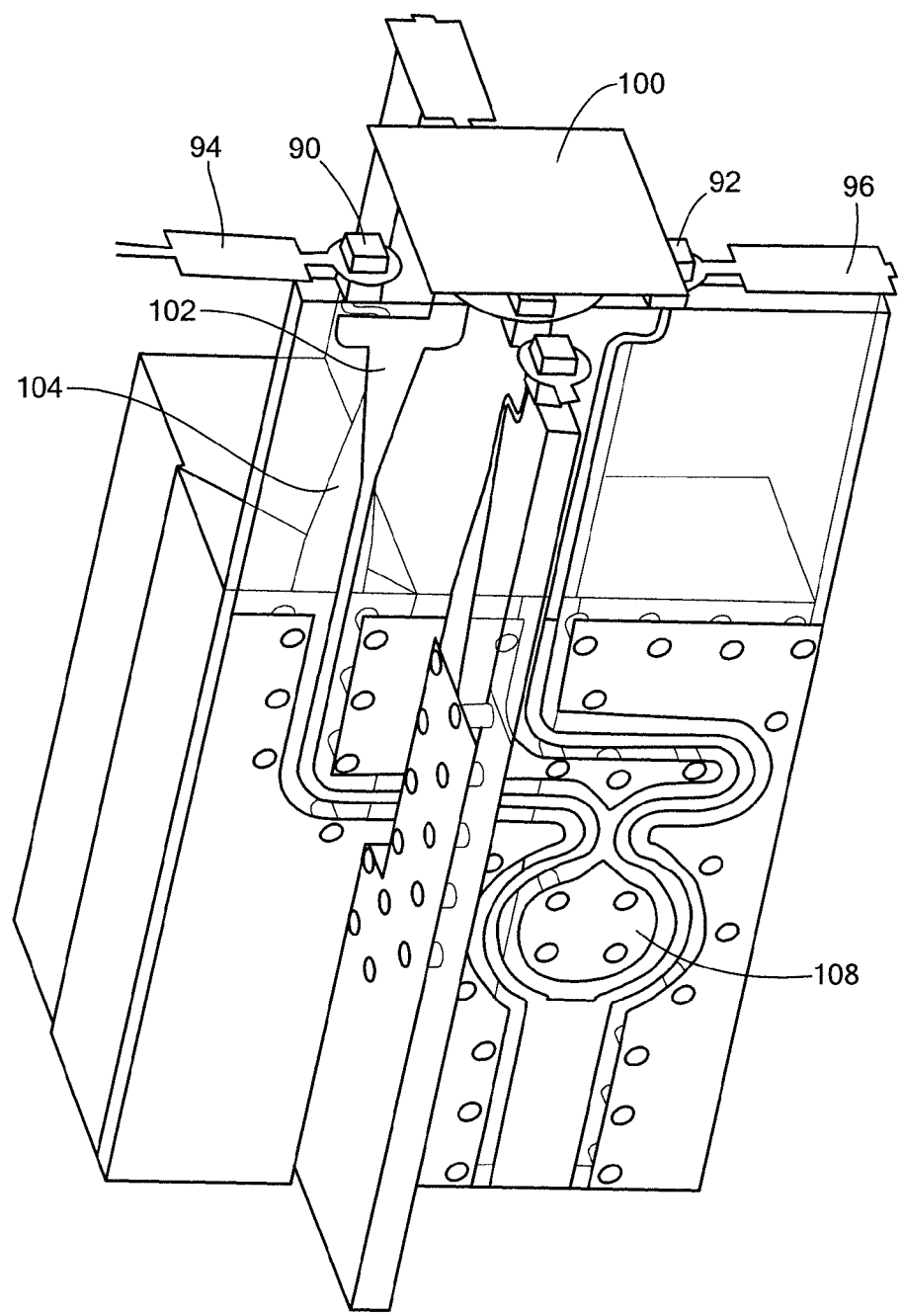
FIG. 7A is a diagram illustrating a portion of an array antenna that uses transmission line segments to feed slots formed between parasitic tiles in accordance with an embodiment.

As described above, in some embodiments, balanced transmission line structures will be coupled to some of the projections on a dielectric panel of an egg crate structure that will be conductively coupled to other transmission structures on a surface of the face sheet or another dielectric layer above the face sheet. The transmission structures on the face sheet, or on the other dielectric layer above the face sheet, act as feeds for the antenna elements of the antenna array. In at least one embodiment, the antenna elements of the array antenna are formed from parasitic tiles elements that are on another layer of the antenna than the transmission structures on the face sheet (or the dielectric layer above the face sheet). In these embodiments, the transmission structures are coupled to the parasitic tile elements by non-conductive coupling. FIG. 7A is a diagram illustrating such an embodiment. As shown, projection 90 and projection 92 may be conductively coupled to transmission line segment 94 and transmission line segment 96 on the face sheet. The transmission line segments may then serve as non-conductive feeds for slots formed between parasitic tile elements 100 on a higher layer. A similar approach may be used in the orthogonal direction to feed slots between tile elements 100 (to achieve dual polarization). In this manner, antenna elements having coincident phase centers may be achieved. This same approach may be used with some or all of the other elements in the array. In other embodiments, other types of radiating elements may be used, including conductively fed elements. As shown in FIG. 7A, in some embodiments, co-planar waveguide (CPW) may be used to implement the balun circuitry 108 on the dielectric panels. FIG. 7A also shows the rotated mirror image transmission line segments 102, 104 associated with one of the balanced feed lines of the balun circuit 108 in an embodiment.

Figure 7B:
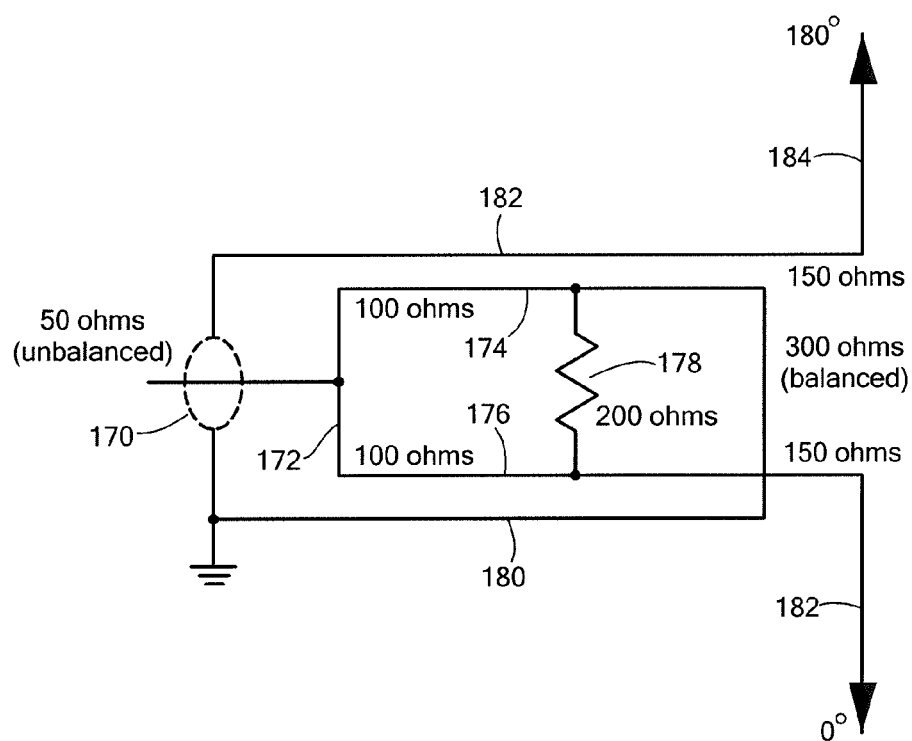
FIG. 7B is a schematic diagram illustrating electrical characteristics of a balun circuit shown in FIG. 7A in accordance with an embodiment.

FIG. 7B is a schematic diagram illustrating electrical characteristics of the balun circuit 108 of FIG. 7A in accordance with an embodiment. With reference to FIG. 7B, an unbalanced, 50 ohm port 170 feeds into a splitter structure 172 that splits the signal into two 100 ohm lines 174, 176. A 200 ohm resistor 178 is coupled across the lines 174, 176. Line 176 is coupled directly out to a transmission line segment on the face sheet (e.g., transmission line segment 96 in FIG. 7A). This line represents the 0-degree phase line of the balanced output signal. Line 174, on the other hand, is first coupled to a ground structure 180 on the lower surface of the dielectric panel. A transmission structure 182 on the lower surface of the panel, which is directly under line 174, is then coupled out from the ground structure to a different transmission line segment on the face sheet (e.g., transmission line segment 94 in FIG. 7A). This line represents the 180-degree phase line of the balanced output signal. Transmission line 174 on the upper surface of the dielectric panel and transmission segment 182 on the lower surface of the dielectric panel represent the rotated mirror image transmission line segments 102, 104 of FIG. 7A. As described previous, these rotated mirror image transmission line segments 102, 104 are used to flip the polarity of the signal on the second output line.

Figure 8:
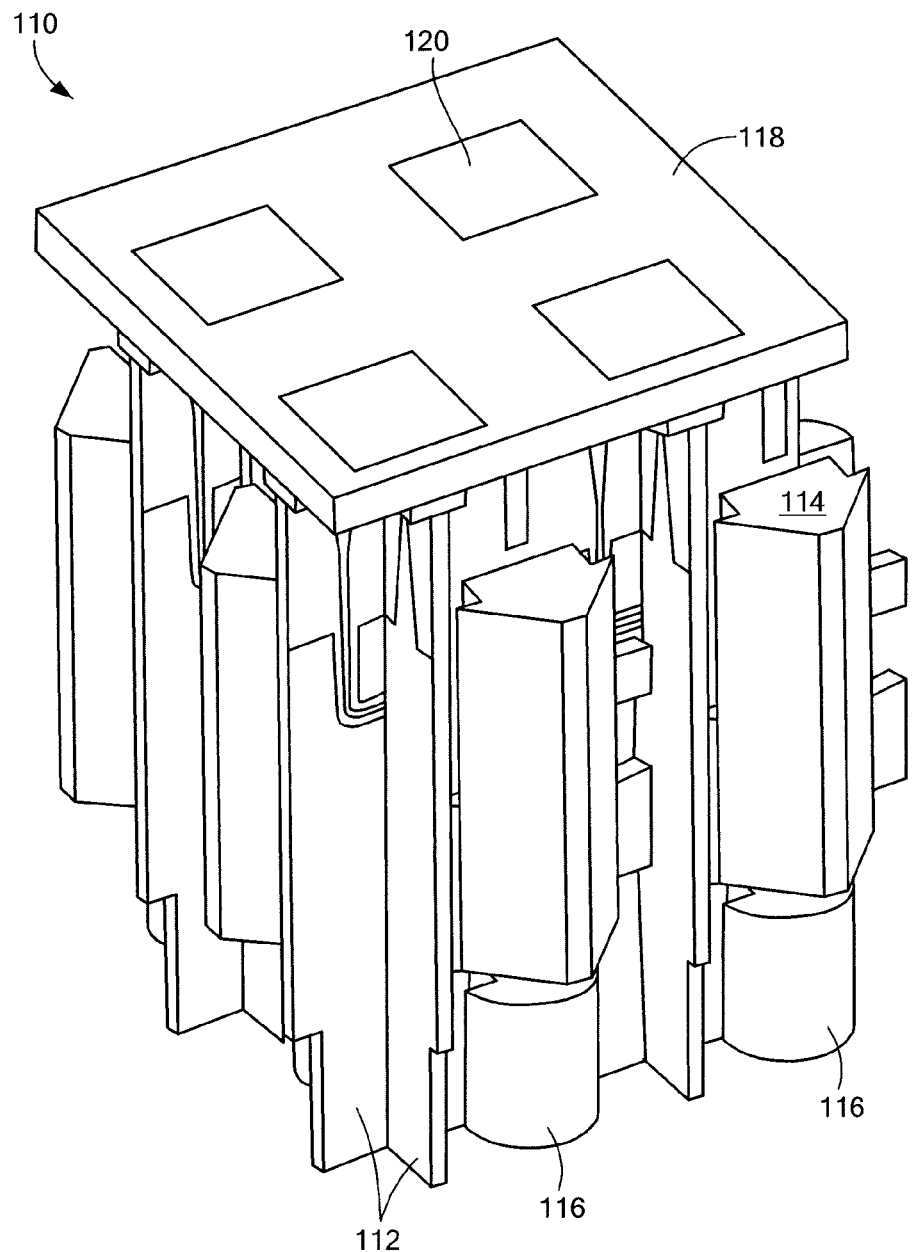
FIG. 8 is a perspective view of a portion of an array antenna having an array of parasitic tiles disposed above an egg crate structure in accordance with an embodiment.

FIG. 8 is a perspective view of a portion of an array antenna 110 in accordance with an embodiment. As illustrated, the array antenna 110 has dielectric panels 112 with ground plane blocks 114 assembled into an egg crate structure. The dielectric panels 112 have radio frequency (RF) connectors 116 attached thereto to facilitate attachment to an external system. In at least one embodiment, the RF connectors are push on coaxial connectors, although many alternative connector types may be used. In some embodiments, no connectors are used. A layer 118 having an array of parasitic tiles 120 is attached above the egg crate structure.

Figure 9:
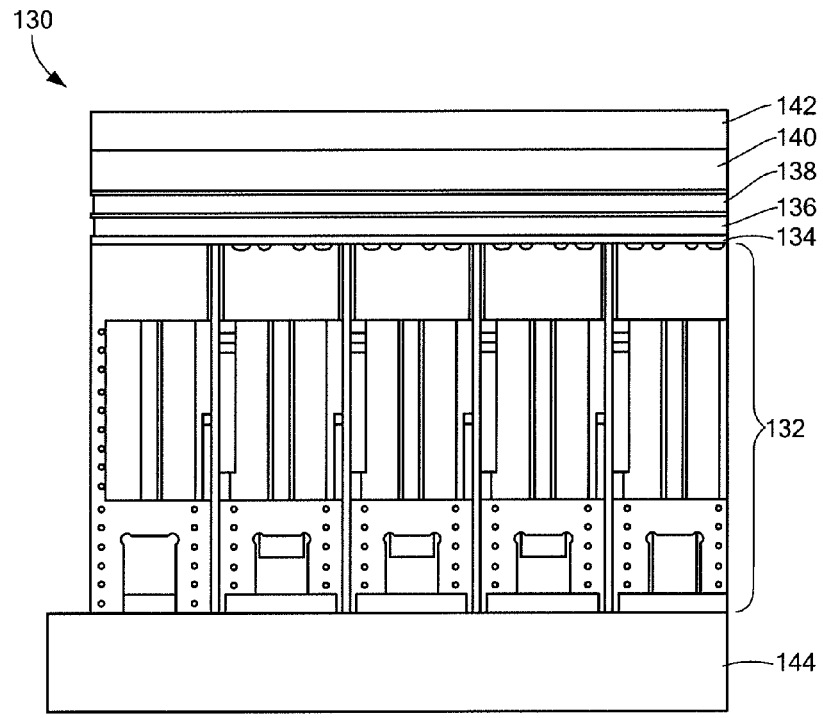
FIG. 9 is a sectional side view of a portion of an array antenna showing the various layers of the antenna in accordance with an embodiment.

FIG. 9 is a sectional side view of a portion of an array antenna 130 showing the various layers of the antenna in accordance with an embodiment. As illustrated, the array antenna 130 may include: an egg crate structure 132 having a face sheet 134; a first antenna element layer 136 having a first array of parasitic tile elements; a second antenna element layer 138 having a second array of parasitic tile elements that substantially align with the elements on the first layer 136; a wide angle impedance matching (WAIM) sheet 140 to optimize, for example, a particular angle or frequency of interest; and a radome 142 covering the antenna 130 to protect the antenna 130 from, for example, an exterior environment. The antenna 130 may be coupled to a support structure 144 at a base thereof. Many alternative layering schemes may be used in other implementations.

In some embodiments, the support structure 144 may include RF connectors for connection to corresponding RF connectors on the panels of the egg crate structure 132. In at least one embodiment, the RF connectors on the panels and the support structure 144 are push-on coaxial connectors, but other connector types may alternatively be used. In some embodiments, no connectors are used and other coupling techniques are utilized to couple signals into and/or out of the antenna system 130 from the external circuitry.

FIG. 10 is a flow chart illustrating a method 150 for operating an array antenna having a plurality of antenna elements disposed on a layer over an egg crate structure formed from a plurality of dielectric panels during a transmit operation in accordance with an embodiment. As illustrated, single-ended RF signals are first provided to feed circuitry disposed on dielectric panels of the egg crate structure (block 152). The single-ended RF signals are next converted to balanced RF signals within the circuitry on the dielectric panels of the egg crate structure (block 154). This circuitry may include, for example, balun circuitry as described previously. In at least one embodiment, the balun circuitry may include a first balanced output line that includes tapered transmission line sections on the top and bottom surface of the first dielectric panel that are rotated mirror images of one another. The balun circuitry may also include a second balanced output line that includes a tapered transmission line section (e.g., line 50 in FIG. 4).

The balanced RF signals may next be coupled from the dielectric panels of the egg crate structure to balanced feed points on corresponding antenna elements of the antenna array. In some embodiments, these balanced signals may be coupled to the antenna elements for two different polarizations (e.g., horizontal and vertical). The technique for coupling the balanced signals to the antenna elements may depend upon the type of antenna elements being used. For example, if parasitic tile elements are used, the balanced signals may first be conductively coupled to transmission line segments on a face sheet of the array antenna from which they are then non-conductively coupled to opposing edges of the corresponding tile elements. The conversions to balanced signals on the dielectric panels do not have to be performed for all of the antenna elements of the array. That is, these conversions may be performed for a subset of the elements (e.g., one or more).

FIG. 11 is a flow chart illustrating a method 160 for operating an array antenna having a plurality of antenna elements disposed on a layer over an egg crate structure formed from a plurality of dielectric panels during a receive operation in accordance with an embodiment. As illustrated, an RF signal may first be received at an array antenna (block 162). Balanced RF signals may then be coupled from the antenna elements to feed circuitry on corresponding dielectric panels of the egg crate structure (block 164). In some embodiments, these balanced signals may be coupled to the feed circuitry on the dielectric panels for two different polarizations (e.g., horizontal and vertical). The balanced RF signals may then be converted to single-ended RF signals within the feed circuitry on the corresponding dielectric panels (block 166). The single-ended RF signals may then be coupled from the dielectric panels to external receiver circuitry for further processing (block 168).

It should be appreciated that, in embodiments that include balun circuitry on the panels of the egg crate structure, such balun circuitry does not have to be provided in all of the open regions of the egg crate structure. That is, in some implementations, balun circuitry may only be provided in some of the open regions of the egg crate structure. Likewise, in embodiments that use ground plane blocks, such blocks do not have to be provided in all of the open regions of the egg crate structure. That is, the blocks may only be provided in some of the open regions.

In the description above, various features, techniques, and concepts are described in the context of dual polarized, co-phase centered arrays. It should be appreciated, however, that these features are not limited to use within arrays with dual polarization or to arrays that have coincident phase centers. That is, most of the described features may be implemented in any type of array antennas.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:
1. An array antenna comprising:
a plurality of radiating elements on a first layer thereof, the plurality of radiating elements including elements that are driven in a balanced fashion;
an egg crate structure below the first layer, the egg crate structure comprising a plurality of first dielectric panels arranged in a first orientation and a plurality of second dielectric panels arranged in a second orientation and interconnected with the plurality of first panels;

at least one balun disposed on at least one of the dielectric panels of the egg crate structure for use in feeding at least one of the radiating elements in the plurality of radiating elements;

wherein the plurality of first dielectric panels and the plurality of second dielectric panels define a plurality of open regions within the egg crate structure, wherein at least some of the plurality of first dielectric panels and at least some of the plurality of second dielectric panels have ground plane blocks attached thereto that at least partially fill corresponding open regions in the egg crate structure; and wherein at least some of the ground plane blocks include two sloped surfaces that allow the ground plane blocks to fit closely together within the open regions of the egg crate structure, wherein at least one sloped surface of a first ground plane block in a first open region is proximate to and substantially parallel with a sloped surface of another ground plane block in the first open region.

2. The array antenna of claim 1, wherein:
the at least one balun includes multiple baluns disposed on multiple dielectric panels of the egg create structure for use in feeding multiple radiating elements in the plurality of radiating elements.

3. The array antenna of claim 2, wherein:
some of the multiple baluns feed corresponding antenna elements in a first polarization direction and some of the multiple baluns feed corresponding antenna elements in a second polarization direction that is orthogonal to the first polarization direction.

4. The array antenna of claim 1, wherein:
the ground plane blocks act collectively to form a ground plane for the array antenna.

5. The array antenna of claim 1, wherein:
at least some of the ground plane blocks partially or fully cover balun circuitry on corresponding dielectric panels, the ground plane blocks having spacer projections to space the blocks from the balun circuitry to prevent shorting.

6. The array antenna of claim 1, wherein:
the ground plane blocks are conductively coupled to planar ground structures disposed on surfaces of corresponding dielectric panels.

7. The array antenna of claim 1, wherein:
the at least one balun is formed using co-planar waveguide.

8. The array antenna of claim 1, further comprising:
at least one isolation resistor coupled between the balanced output lines of a balun disposed on a dielectric panel of the egg crate structure.

9. The array antenna of claim 1, wherein the at least one balun includes:
a first balanced output line that includes tapered transmission line sections on the top and bottom surfaces of the at least one dielectric panel of the egg crate structure that are rotated mirror images of one another; and
a second balanced output line that includes a tapered transmission line section, wherein the second balanced output line is different from the first balanced output line.

10. An array antenna comprising:
a plurality of radiating elements on a first layer thereof, the plurality of radiating elements including elements that are driven in a balanced fashion;
an egg crate structure below the first layer, the egg crate structure comprising a plurality of first dielectric panels arranged in a first orientation and a plurality of second dielectric panels arranged in a second orientation and interconnected with the plurality of first panels;

at least one balun disposed on at least one of the dielectric panels of the egg crate structure for use in feeding at least one of the radiating elements in the plurality of radiating elements;

the plurality of first dielectric panels and the plurality of second dielectric panels define a plurality of open regions within the egg crate structure, wherein at least some of the plurality of first dielectric panels and at least some of the plurality of second dielectric panels have ground plane blocks attached thereto that at least partially fill corresponding open regions in the egg crate structure; and wherein at least some of the ground plane blocks include two sloped surfaces that allow the ground plane blocks to fit within the open regions of the egg crate structure, wherein at least one sloped surface of a first ground plane block in a first open region is proximate to and substantially parallel with a sloped surface of another ground plane block in the first open region.

11. The array antenna of claim 10, wherein:
the plurality of first dielectric panels are substantially orthogonal to the plurality of second dielectric panels and the plurality of open regions within the egg crate structure include a plurality of substantially rectangular regions; and
each of the two sloped surfaces of the first ground plane block form an approximately 45 degree angle with a surface of a dielectric panel carrying the first ground plane block.

12. The array antenna of claim 11, wherein:
the egg crate structure includes at least one substantially rectangular region that includes four ground plane blocks; and
the array antenna further comprises an elongated member of energy absorbing material located within a space between the four ground plane blocks in the at least one substantially rectangular region to prevent electromagnetic resonance effects in the space.

13. The array antenna of claim 10, wherein:
the at least one balun includes multiple baluns disposed on multiple dielectric panels of the egg create structure for use in feeding multiple radiating elements in the plurality of radiating elements.

14. The array antenna of claim 13, wherein:
some of the multiple baluns feed corresponding antenna elements in a first polarization direction and some of the multiple baluns feed corresponding antenna elements in a second polarization direction that is orthogonal to the first polarization direction.

15. The array antenna of claim 10, wherein:
the ground plane blocks act collectively to form a ground plane for the array antenna; and
wherein at least some of the ground plane blocks partially or fully cover balun circuitry on corresponding dielectric panels, the ground plane blocks having spacer projections to space the blocks from the balun circuitry to prevent shorting.

16. The array antenna of claim 10, wherein:
the ground plane blocks are conductively coupled to planar ground structures disposed on surfaces of corresponding dielectric panels.

17. An array antenna of claim 1, wherein comprising:
a plurality of radiating elements on a first layer thereof, the plurality of radiating elements including elements that are driven in a balanced fashion;
an egg crate structure below the first layer, the egg crate structure comprising a plurality of first dielectric panels arranged in a first orientation and a plurality of second dielectric panels arranged in a second orientation and interconnected with the plurality of first panels;

at least one balun disposed on at least one of the dielectric panels of the egg create structure for use in feeding at least one of the radiating elements in the plurality of radiating elements; and wherein the first dielectric panels and the second dielectric panels have projections from edges thereof that fit through openings on a face sheet, the projections being secured to the face sheet on an opposite side of the face sheet from the panels, at least some of the projections having conductive transmission structures disposed thereon that are conductively coupled to transmission structures on the opposite side of the face sheet, wherein the conductive transmission structures on the projections and the transmission structures disposed on the opposite side of the face sheet include feed structures for use in feeding the plurality of radiating elements.

18. The array antenna of claim 17, wherein:

the plurality of radiating elements on the first layer include an array of tiles that define radiating slots;

the first layer is located above the face sheet; and the transmission structures disposed on the opposite side of the face sheet are non-conductively coupled to the array of tiles.

19. The array antenna of claim 17, wherein:

the conductive transmission structures on two projections of a first dielectric panel include balanced lines that are coupled to a balun disposed on the first dielectric panel.

20. The array antenna of claim 17, wherein:

the at least one balun includes multiple baluns disposed on multiple dielectric panels of the egg create structure for use in feeding multiple radiating elements in the plurality of radiating elements.

21. The array antenna of claim 20, wherein:

some of the multiple baluns feed corresponding antenna elements in a first polarization direction and some of the multiple baluns feed corresponding antenna elements in a second polarization direction that is orthogonal to the first polarization direction.

22. The array antenna of claim 17, wherein:

the ground plane blocks act collectively to form a ground plane for the array antenna; and wherein at least some of the ground plane blocks partially or fully cover balun circuitry on corresponding dielectric panels, the ground plane blocks having spacer projections to space the blocks from the balun circuitry to prevent shorting.

23. The array antenna of claim 17, wherein:

the ground plane blocks are conductively coupled to planar ground structures disposed on surfaces of corresponding dielectric panels.

* * * * *